United States Patent
Van Der Schrick et al.

[11] Patent Number: 6,001,939
[45] Date of Patent: Dec. 14, 1999

[54] PROCESS FOR THE POLYMERIZATION OF OLEFINS

[75] Inventors: Bernard Van Der Schrick; Charles Detrez; Jiang Bian, all of Brussels, Belgium

[73] Assignee: Solvay Polyolefins Europe-Belgium, Brussels, Belgium

[21] Appl. No.: 08/813,392

[22] Filed: Mar. 7, 1997

Related U.S. Application Data

[63] Continuation of application No. 08/532,282, Sep. 22, 1995, abandoned.

[30] Foreign Application Priority Data

Sep. 22, 1994 [BE] Belgium ............................. 09400858

[51] Int. Cl.⁶ ...................................................... C08F 4/44
[52] U.S. Cl. ..................................... 526/124.8; 526/124.2; 526/124.7
[58] Field of Search .............................. 526/124.7, 124.8

[56] References Cited

U.S. PATENT DOCUMENTS

| | | | |
|---|---|---|---|
| 4,105,846 | 8/1978 | Hoff et al. | 526/124 |
| 4,305,840 | 12/1981 | Zucchini et al. | 526/124.8 |
| 4,588,703 | 5/1986 | Cowan et al. | 526/124.7 |
| 4,588,704 | 5/1986 | Drake et al. | 502/111 |
| 4,617,360 | 10/1986 | Bienfait | 526/124.7 |
| 5,225,502 | 7/1993 | Sato et al. | 526/128 |
| 5,278,118 | 1/1994 | Cuffiana et al. | 526/124.8 |
| 5,629,390 | 5/1997 | Nishimura et al. | 526/119 |

FOREIGN PATENT DOCUMENTS

| | | |
|---|---|---|
| 0 480 375 | 4/1992 | European Pat. Off. . |
| 2 656 313 | 6/1991 | France . |
| 1 464 909 | 2/1977 | United Kingdom . |
| 1539175 | 1/1979 | United Kingdom . |

*Primary Examiner*—David W. Wu
*Assistant Examiner*—Roberto Rabago
*Attorney, Agent, or Firm*—Venable; George H. Spencer; Marina V. Schneller

[57] ABSTRACT

Process for the polymerization of olefins, in which at least one olef in is placed in contact with a catalytic system comprising:

(a) a solid catalytic complex based on magnesium, on transition metal and on halogen, and (b) an organometallic compound of a metal from groups IA, IIA, IIB, IIIA and IVA of the Periodic Table, the said solid catalytic complex (a) being prepared by reacting, in a first step, at least one magnesium compound with at least one compound of a transition metal from group IVB or VB of the Periodic Table until a liquid complex is obtained, by treating the said liquid complex, in a second step, using a halogen-containing organoaluminium compound, in order to precipitate the liquid complex as a solid catalytic complex, by separating, in a third step, the solid catalytic complex precipitated and by treating, in a fourth step, the separated solid catalytic complex obtained after the third step using a halogen-containing organoaluminium compound of general formula $AlR_nX_{3-n}$.

The process has the effect of increasing the apparent density of the polyolefin.

23 Claims, No Drawings

PROCESS FOR THE POLYMERIZATION OF OLEFINS

This application is a continuation, of application Ser. No. 08/532,282, Filed Sep. 22, 1995 now abandoned.

FIELD OF THE INVENTION

The present invention relates to a process for the polymerization of olefins, more precisely to a polymerization process in the presence of a catalytic system comprising a solid catalytic complex based on magnesium, on transition metal and on halogen and an organometallic compound (cocatalyst).

TECHNOLOGY REVIEW

British Patent GB 1,464,909 discloses catalytic systems comprising a solid based on magnesium, on transition metal and on halogen, and a cocatalyst. In Example 1 of that patent, ethylene is polymerized in the presence of triisobutylaluminium and a catalytic solid, which is obtained by mixing magnesium ethoxide with tetrabenzyltitanium and by adding thereto a halogen-containing organoaluminium compound (ethylaluminium dichloride) until a solid precipitate is obtained. The precipitate obtained is then isolated.

The polyethylene obtained in the presence of this known catalytic solid has a relatively low apparent density, thereby reducing the production capacity of an industrial process for the manufacture of polyethylene by means of this catalytic solid.

The invention is directed towards overcoming this drawback by providing a novel process for the manufacture of polyolefins which have a higher apparent density.

SUMMARY OF THE INVENTION

To this end, the invention relates to a process for the polymerization of olefins, in which at least one olefin is placed in contact with a catalytic system comprising:

(a) a solid catalytic complex based on magnesium, on transition metal and on halogen, and (b) an organometallic compound of a metal from groups IA, IIA, IIB, IIIA and IVA of the Periodic Table, characterized in that the said solid catalytic complex (a) is prepared by reacting, in a first step, at least one magnesium compound chosen from oxygen-containing organomagnesium compounds and halogen-containing magnesium compounds with at least one compound of a transition metal from group IVB or VB of the Periodic Table chosen from oxygen-containing organic transition metal compounds and halogen-containing transition metal compounds, until a liquid complex is obtained, by treating the said liquid complex, in a second step, using a halogen-containing organoaluminium compound of general formula $AlR_nX_{3-n}$ in which R is a hydrocarbon radical, X is a halogen and n is less than 3, in order to precipitate the liquid complex as a solid catalytic complex, by separating, in a third step, the solid catalytic complex precipitated from the reaction medium of the second step and by treating, in a fourth step, the separated solid catalytic complex obtained after the third step using a halogen-containing organoaluminium compound of general formula $AlR_nX_{3-n}$.

The first three steps in the preparation of the catalytic complex (a) are known. One of the essential characteristics of the polymerization process of the invention lies in the use of a solid catalytic complex (a) whose preparation involves a fourth step consisting of a subsequent treatment using a halogen-containing organoaluminium compound of the separated solid catalytic complex obtained after the third step, it being optionally possible for the said subsequent treatment to be repeated several times. This subsequent treatment using a halogen-containing organoaluminium compound will be denoted for short hereinbelow by the term "post-treatment".

The post-treatment may be performed by repetition of the first treatment using a halogen-containing organoaluminium compound (second step), that is to say under the same operating conditions (temperature, pressure, rate of addition of the reactants, etc.) and with the same halogen-containing organoaluminium compound(s) in the same amounts. As a variant, the post-treatment may be performed under other operating conditions and/or with other reactants and/or in different amounts. In the case where the post-treatment is repeated several times, the same halogen-containing organoaluminium compound or different organoaluminium compounds may be used in each of these subsequent treatments. The post-treatment may be repeated several times, for example once or twice. Generally, it is not repeated more than once. It is preferred to carry out only a single post-treatment, such that the fourth step comprises a single treatment using a halogen-containing organoaluminium compound. It is moreover preferable to carry out the post-treatment with a halogen-containing organoaluminium compound which is identical to that used in the second step and under the operating conditions of the second step.

The total amount of halogen-containing organoaluminium compound to be used in the post-treatment(s) may be less than, identical to or greater than that used in the second step and varies depending on the desired molecular weight distribution width for the polyolefin. It is usually at least 0.1 mol of aluminium per mole of transition metal used, more precisely at least 0.2 mol, values of at least 0.5 mol being recommended; it is usually not more than 40 mol of aluminium per mole of transition metal used, preferably not more than 20 mol, values of not more than 10 mol being the most advantageous.

In the process according to the invention, the purpose of the post-treatment is to continue the reaction started in the second step which constitutes a first treatment using a halogen-containing organoaluminium compound. More precisely, the purpose of the reaction of the second step is to reduce the valency of the transition metal present in the transition metal compound of the liquid complex. Where appropriate, it simultaneously has the purpose of halogenating the magnesium compound and/or the transition metal compound which are present in the liquid complex, that is to say of substituting the alkoxy groups present in the magnesium compound and/or in the transition metal compound with halogens. The reduction and the possible halogenation thereby result in precipitation of the liquid complex obtained after the first step, as a solid catalytic complex. The reduction and the possible halogenation are performed simultaneously using a halogen-containing organoaluminium compound which thus acts as a reductive halogenating agent, causing precipitation of a solid catalytic complex.

After the first treatment using a halogen-containing organoaluminium compound (second step), a solid catalytic complex is collected, consisting of a homogeneous precipitate (the constituents being co-precipitated from a liquid complex) of a mixture of a magnesium halide, a transition metal halide and compounds which are partially reduced and/or partially halogenated. These are chemically bonded complexes, the products of chemical reactions and not the result of mixing or of adsorption phenomena. Indeed, it is impossible to dissociate either of the constituents of these complexes by using purely physical separation methods.

The purpose of the characteristic post-treatment is to continue the reduction and the possible halogenation of the solid complex. The level of reduction and, where appropriate, the level of halogenation which are obtained are determined by the number of subsequent treatments, the nature and the amount of halogen-containing organoaluminium compound used.

After the post-treatment, a solid catalytic complex of the same nature as that described above (chemically bonded complex) but containing fewer partially reduced and/or partially halogenated compounds is collected.

A surprising effect of the present invention lies in the fact that, for the same total amount of halogen-containing organoaluminium compound used, splitting of the treatment using such a compound into several (at least 2) distinct and successive treatments makes it possible to obtain at the end a solid catalytic complex (a) which leads to the manufacture of polyolefins of higher apparent density.

The post-treatment using a halogen-containing organoaluminium compound (as for the first treatment in the second step) may be carried out by any suitable known means, and preferably by gradually adding the halogen-containing organoaluminium compound to the solid catalytic complex obtained from the preceding step (or, in the second step, to the liquid complex obtained from the first step). To this end, the organoaluminium compound may be added in the pure state to the solid catalytic complex (or to the liquid complex) or in the form of a solution in a solvent such as liquid aliphatic, cycloaliphatic and aromatic hydrocarbons. The preferred diluents are hydrocarbons containing up to 20 carbon atoms, and in particular linear alkanes (such as n-butane, n-hexane and n-heptane) or branched alkanes (such as isobutane, isopentane and isooctane) or cycloalkanes (such as cyclopentane and cyclohexane). Good results are obtained with linear alkanes. Hexane is preferred.

The halogen-containing organoaluminium compounds used in the post-treatment (as for those used in the second step) are advantageously chosen from those of formula $AlR_nX_{3-n}$ in which R is a hydrocarbon radical comprising up to 20 carbon atoms and preferably up to 6 carbon atoms, and mixtures thereof. Good results are obtained when R is an alkyl (linear or branched), cycloalkyl, arylalkyl, aryl or alkylaryl radical. The best results are obtained when R represents a linear or branched alkyl radical. X is generally chosen from fluorine, chlorine, bromine and iodine. Chlorine is particularly suitable. Preferably, n does not exceed 1.5 and more especially does not exceed 1. As examples of halogen-containing organoaluminium compounds which may be used in the invention, there may be mentioned aluminium trichloride $[AlCl_3]$, ethylaluminium dichloride $[Al(C_2H_5)Cl_2]$, ethylaluminium sesquichloride $[Al_2(C_2H_5)_3Cl_3]$ and diethylaluminium chloride $[Al(C_2H_5)_2Cl]$. Ethylaluminium dichloride or isobutylaluminium dichloride is preferred. Isobutylaluminium dichloride is particularly preferred, since it allows solid catalytic complexes to be manufactured which produce polymers whose particle size distribution (size of the polymer particles) is narrower than for other halogen-containing organoaluminium compounds. In particular, it avoids the formation of fine polymer particles when compared with other halogen-containing organoaluminium compounds such as ethylaluminium dichloride.

The temperature at which the post-treatment (and the second step) is performed is advantageously below the boiling point, at ordinary pressure, of the halogen-containing organoaluminium compound. It is usually at least −20° C., more particularly at least 0° C., temperatures of at least 20° C. being recommended. The temperature usually does not exceed 150° C., and more especially does not exceed 100° C., temperatures of not more than 80° C. being the most common.

The pressure at which the post-treatment (and the second step) is carried out does not constitute a critical factor. For reasons of convenience, the process is generally performed at atmospheric pressure. The rate of addition of the reactants is generally chosen so as not to cause sudden heating of the reaction medium due to a possible self-acceleration of the reaction. The reaction medium is generally stirred so as to promote its homogenization throughout the step or the treatment.

In a first advantageous embodiment of the invention, the second step in the preparation of the solid catalytic complex (i.e. the precipitation step) is immediately followed by a maturation step (preceding the third step), the purpose of which is to make it possible to obtain solid catalytic complexes having improved resistance to uncontrolled breakdown on polymerization.

In addition, the maturation makes it possible to remove the fine particles which do not settle out readily and which are consequently difficult to separate from the reaction medium of the second step. The maturation is carried out at a temperature generally equivalent to or above that at which the second step takes place. It is carried out for a non-critical period ranging from 5 minutes to 12 hours in general, preferably for at least 0.5 hour.

In a second advantageous embodiment of the invention, the third step in the preparation of the solid catalytic complex (i.e. the step of separation of a solid complex) is immediately followed by a washing operation (preceding the fourth step) so as to remove the excess reactants and the possible by-products formed during the preparation, with which the precipitated solid catalytic complex may still be impregnated. The washing operation makes it possible to modify the properties of the solid catalytic complex and in particular the response of the solid catalytic complex to molecular weight regulators such as hydrogen. As a result, the washing makes it possible to regulate the molecular weight distribution width and the oligomer content of the polymers obtained using the solid catalytic complex. Moreover, the washing operation also makes it possible, surprisingly, to obtain the same result as in the absence of a washing operation with a reduced amount of halogen-containing organoaluminium compound in the fourth step. Preferably, a maturation as described above precedes the third step which is followed by the washing operation. Any inert diluent may be used for this washing operation and, in particular, alkanes and cycloalkanes containing up to 20 carbon atoms. Hexane and isobutane are suitable for use. After washing, the solid catalytic complex may be dried, for example, by flushing with a stream of an inert gas such as nitrogen, which is preferably dry.

In a third advantageous embodiment of the invention, the post-treatment, or, where appropriate, each of the post-treatments, is followed by a maturation which may be carried out under the temperature and duration conditions described above, and/or by a washing operation as described above. When a maturation and a washing operation are carried out, it is preferable to carry out the maturation before the washing operation.

As already mentioned above, preparation of the solid catalytic complex (a) used in the polymerization process according to the invention comprises three distinct and successive steps which are known per se, namely, a first step for formation of a liquid complex, a second step for precipitation of the liquid complex as a solid complex and a third step for separation of the solid complex, each of these steps being known per se.

The solid catalytic complex used in the process according to the invention is preferably not prepolymerized.

The first known step lies in the preparation of a liquid complex by reaction of a magnesium compound with a transition metal compound. Obviously, several different magnesium compounds may be used simultaneously. Similarly, it is also possible to use simultaneously several different compounds of a transition metal or several compounds in which the transition metal is different. The reaction of the first step may be performed by any suitable known method, provided that it makes it possible to obtain a complex in the liquid state. When the magnesium compound and/or the transition metal compound are liquid under the operating conditions of the reaction, it is desirable to perform the reaction simply by mixing these reactants together in the absence of solvent or diluent. However, the reaction may be performed in the presence of a diluent when the amount of liquid present in the reaction medium is not sufficient for the reaction to be complete or when the two reactants are solid under the operating conditions of the reaction. The diluent is generally chosen from those which are capable of dissolving at least one of the reactants and in particular from the solvents described above.

The amount of transition metal compound used is defined relative to the amount of magnesium compound used. This amount may vary within a wide range. In general, it is at least 0.01 mol of transition metal present in the transition metal compound per mole of magnesium present in the magnesium compound, in particular at least 0.02 mol, values of at least 0.05 being preferred. The amount is usually not more than 20 mol of transition metal present in the transition metal compound per mole of magnesium present in the magnesium compound, more precisely not more than 10 mol, values of not more than 5 mol being recommended.

The temperature at which the magnesium compound is placed together with the transition metal compound in the first step for the preparation of the solid catalytic complex depends on the nature of the reactants and is preferably below the decomposition temperature of the reactants and of the liquid complex obtained after the reaction. It is generally at least $-20°$ C., in particular at least $0°$ C., temperatures of at least $20°$ C. being the most common. The temperature is usually not more than $200°$ C., more especially not more than $180°$ C., temperatures of not more than $150°$ C. being advantageous, for example of about $140°$ C.

The duration of the first step in the preparation of the solid catalytic complex depends on the nature of the reactants and on the operating conditions, and is advantageously long enough to obtain a complete reaction between the reactants. The duration may generally range from 10 minutes to 20 hours, more precisely from 2 to 15 hours, for example from 4 to 10 hours.

The pressure at which the reaction of the first step is carried out and the rate of addition of the reactants are not critical factors. For reasons of convenience, the process is generally performed at atmospheric pressure; the rate of addition is generally chosen so as not to cause sudden heating of the reaction medium due to a possible self-acceleration of the reaction. The reaction medium is generally stirred so as to promote its homogenization throughout the reaction. The reaction may be performed in a continuous or batch-wise manner.

After the first step in the preparation of the solid catalytic complex, a liquid complex of the magnesium compound and the transition metal compound is collected, which liquid complex may be used as it is in the subsequent step or may optionally be stored in a diluent, preferably an inert diluent, so as subsequently to recover it intact and to use it in the presence of the diluent. The diluent is usually chosen from aliphatic or cycloaliphatic hydrocarbons, preferably containing up to 20 carbon atoms, such as, for example, alkanes such as isobutane, pentane, hexane or heptane, or cyclohexane, or mixtures thereof. Hexane is particularly suitable.

The magnesium compound is chosen from oxygen-containing organomagnesium compounds and halogen-containing magnesium compounds.

The term oxygen-containing organomagnesium compound is understood to denote all the compounds in which an organic radical is bonded to magnesium via oxygen, that is to say all the compounds comprising at least one magnesium-oxygen-organic radical bonding sequence per magnesium atom. The organic radicals bonded to the magnesium via oxygen are generally chosen from radicals comprising up to 20 carbon atoms and, more particularly, from those comprising up to 10 carbon atoms. Good results are obtained when these radicals comprise from 2 to 6 carbon atoms. These radicals may be saturated or unsaturated, containing a branched chain or containing a straight or cyclic chain. They are preferably chosen from hydrocarbon radicals and in particular from alkyl (linear or branched), alkenyl, aryl, cycloalkyl, arylalkyl, alkylaryl and acyl radicals and the substituted derivatives thereof.

In addition to the organic radicals bonded to magnesium via oxygen, the oxygen-containing organomagnesium compounds may include other radicals. These other radicals are preferably the radicals —OH, —$(SO_4)_{1/2}$, —$NO_3$, —$(PO_4)_{1/3}$, —$(CO_3)_{1/2}$ and —$ClO_4$. They may also be organic radicals which are bonded directly to the magnesium via carbon.

Among the oxygen-containing organomagnesium compounds which may be used, there may be mentioned alkoxides (such as ethoxide and cyclohexanolate), alkylalkoxides (such as ethylethoxide), hydroxyalkoxides (such as hydroxymethoxide), phenoxides (such as naphthoxide), and optionally hydrated carboxylates (such as acetate and benzoate). They may also be oxygen- and nitrogen-containing organic compounds, that is to say compounds comprising magnesium-oxygen-nitrogen-organic radical bonding sequences (such as oxymates, in particular butyloxymate, and hydroxylamine acid salts, in particular the derivative of N-nitroso-N-phenyl-hydroxylamine), chelates, that is to say oxygen-containing organic compounds in which the magnesium possesses at least one normal bonding sequence of the magnesium-oxygen-organic radical type and at least one coordination bond, so as to form a heterocycle in which the magnesium is included (such as enolates, in particular acetylacetonate), and silanolates, that is to say compounds comprising magnesium-oxygen-silicon-hydrocarbon radical bonding sequences (such as triphenylsilanolate). Examples of oxygen-containing organomagnesium compounds which may also be mentioned are those comprising several different organic radicals (such as magnesium methoxyethoxide), alkoxide and phenoxide complexes of magnesium and another metal (such as $Mg[Al(OR)_4]_2$) and mixtures of two or more of the oxygen-containing organomagnesium compounds defined above.

The term halogen-containing magnesium compound is understood to denote all the compounds comprising at least one magnesium-halogen bond. The halogen may be fluorine, chlorine, bromine or iodine. The halogen is preferably chlorine.

Among the halogen-containing magnesium compounds which may be mentioned are dihalides, preferably containing not more than one molecule of water per molecule of dihalide, complexed dihalides (such as $MgCl_2.6NH_3$ or $MgCl_2.6CH_3OH$), and compounds comprising, besides the magnesium-halogen bond, an organic radical which is bonded to the magnesium via oxygen (such as Mg(OH)Cl or Mg(O—$CH_3$)Cl). They may also be compounds comprising, besides the magnesium-halogen bond, a magnesium-organic radical bond (such as Mg($C_2H_5$)Cl), the hydrolysis products of hydrated magnesium halides, as long as these products still contain magnesium-halogen bonds, mixed compositions comprising halogen-containing and oxygen-containing magnesium compounds (such as $MgCl_2.MgO.H_2O$) and mixtures of two or more of the halogen-containing magnesium compounds defined above.

Among all the magnesium compounds which are suitable, it is preferred to use those which contain, on each magnesium atom, only magnesium-oxygen-organic radical bonds and/or magnesium-halogen bonds, to the exclusion of any other bonding. The best results are obtained with the oxygen-containing organic compounds, in particular with those comprising only magnesium-oxygen-organic radical bonds on each magnesium atom. Magnesium alkoxides are particularly preferred. The best results are obtained with magnesium dialkoxides, in particular magnesium diethoxide.

The transition metal compound is chosen from oxygen-containing organic transition metal compounds and halogen-containing transition metal compounds.

The term oxygen-containing organic transition metal compound is understood to denote all the compounds in which an organic radical is bonded to the transition metal via oxygen, that is to say all the compounds comprising at least one transition metal-oxygen-organic radical bonding sequence per transition metal atom. The organic radicals are in accordance with those defined above for the oxygen-containing organomagnesium compounds.

The transition metal is advantageously chosen from titanium, zirconium, hafnium and vanadium. Titanium and zirconium are suitable for use. Titanium is particularly preferred. In the case of titanium, zirconium or hafnium, the tetravalent transition metal compounds are preferably used since they are usually liquid and, in any case, are more often soluble and more soluble than those in which the transition metal has a valency of less than 4.

The oxygen-containing organic transition metal compounds which may be used may also comprise transition metal-oxygen-transition metal bonds.

The oxygen-containing organic transition metal compounds may be represented by the general formula $MO_x(OR')_{m-2x}$ where M represents the transition metal of valency m, R' represents an organic radical as defined above and x is a number such that $0 \leq x \leq (m-1)/2$. It is preferred to use the compounds in which x is such that $0 \leq x \leq (m-2)/2$.

It goes without saying that the oxygen-containing organic transition metal compounds may comprise several different organic radicals.

Among the oxygen-containing organic transition metal compounds which may be mentioned are alkoxides (such as Ti(O-n$C_4H_9$)$_4$), phenoxides (such as Zr(O$C_6H_5$)$_4$), oxyalkoxides (such as HfO(O$C_2H_5$)$_2$), condensed alkoxides (such as $Ti_2O$(O-i$C_3H_7$)$_6$), carboxylates (such as Zr(OOC$CH_3$)$_4$) and enolates (such as hafnium acetylacetonate).

The term halogen-containing transition metal compound is understood to denote all the compounds comprising at least one transition metal-halogen bond. The halogen is in accordance with that defined above for the halogen-containing magnesium compounds. Chlorine is preferred.

Among the halogen-containing transition metal compounds which may be mentioned are halides, in particular tetrahalides (such as $TiCl_4$), complexed halides (such as $ZrCl_4.6NH_3$), halide complexes of a transition metal and an alkali metal (such as $Na_2TiCl_6$), oxyhalides (such as $HfOCl_2$) and haloalkoxides (such as Ti(O$C_2H_5$)$_2Cl_2$ or Zr(Oi$C_3H_7$)$_3$Cl).

It goes without saying that several transition metal compounds may be used simultaneously. When it is desired to obtain a polyolef in having a wide molecular weight distribution, it may prove to be preferable to use compounds of different transition metals, in particular a titanium compound and a zirconium compound.

Among all the transition metal compounds which are suitable, it is preferred to use those which contain, on each transition metal atom, only transition metal-oxygen-organic radical bonds and/or transition metal-halogen bonds, to the exclusion of any other bonding. The best results are obtained with oxygen-containing organic transition metal compounds, in particular with those comprising only transition metal-oxygen-organic radical bonds on each transition metal atom. Alkoxides are suitable for use. The best results are obtained with the tetraalkoxides of titanium or of zirconium, in particular titanium or zirconium tetrabutoxide.

The known second step, which lies in a (first) treatment using a halogen-containing organoaluminium compound in order to precipitate a solid catalytic complex and the purpose of which is described above, is performed under conditions in accordance with those of the post-treatment, which have been detailed above.

The amount of halogen-containing organoaluminium compound to be used in the second step should be sufficient to precipitate a minimum amount of solid catalytic complex which is separable from the reaction medium of the second step. It is generally at least 0.5 mol of aluminium per mole of transition metal used, preferably at least 1 mol, values of at least 2 mol being the most common; it is commonly not more than 50 mol of aluminium per mole of transition metal used, in particular not more than 30 mol, values of not more than 20 mol being advantageous.

The nature of the solid complex precipitated after the second step is already described above.

The known third step consists in separating out the solid catalytic complex precipitated after the second step. This separation may be performed by any suitable known means, for example by filtration or by centrifugation.

Besides the solid catalytic complex (a) based on magnesium, on transition metal and on halogen as described above, the catalytic system used in the process for the polymerization of an olefin according to the invention comprises an organometallic compound (b) of a metal from groups IA, IIA, IIB, IIIA and IVA of the Periodic Table. This organometallic compound, which serves as an activator for the solid catalytic complex and is commonly referred to as a "cocatalyst" may be chosen from organometallic compounds of lithium, magnesium, zinc, aluminium or tin. The best results are obtained with organoaluminium compounds.

As organometallic compound, there may be used totally alkylated compounds in which the alkyl chains comprise up to 20 carbon atoms and are straight or branched, such as, for example, n-butyllithium, diethylmagnesium, diethylzinc, tetraethyltin, tetrabutyltin and trialkylaluminiums. It is also possible to use alkylmetal hydrides in which the alkyl radicals also comprise up to 20 carbon atoms, such as diisobutylaluminium hydride and trimethyltin hydride. Alkylmetal halides in which the alkyl radicals also comprise up to 20 carbon atoms, such as ethylaluminium sesquichloride, diethylaluminium chloride and diisobutylaluminium chloride, are equally suitable. It is also possible to use organoaluminium compounds obtained by reacting trialkylaluminiums or dialkylaluminium hydrides, in which the radicals comprise up to 20 carbon atoms, with diolefins comprising from 4 to 20 carbon atoms, and more particularly the compounds referred to as isoprenylaluminiums.

In general, preference is given to trialkylaluminiums and in particular to those in which the alkyl chains are straight and comprise up to 18 carbon atoms, more particularly from 2 to 8 carbon atoms. Triethylaluminium and triisobutylaluminium are preferred.

The total amount of organometallic compound (b) used in the polymerization process of the invention may vary within a wide range. It is generally from 0.02 to 50 mmol per liter of solvent, of diluent or of reactor volume, and preferably from 0.2 to 2.5 mmol per 1.

The amount of solid catalytic complex (a) used in the polymerization process of the invention is determined as a function of the transition metal content of the said complex. It is generally chosen such that the concentration is from 0.001 to 2.5 and preferably from 0.01 to 0.25 mmol of transition metal per liter of solvent, of diluent or of reactor volume.

The molar ratio of the total amount of the metal present in the organometallic compound to the total amount of the transition metal present in the transition metal compound is usually at least 1, in particularly at least 5, values of at least 10 being advantageous. The ratio is generally not more than 100, preferably not more than 75, values of not more than 50 being recommended.

Besides the solid catalytic complex (a), and the organometallic compound (b) which are detailed above, the catalytic system used in the polymerization process according to the invention may comprise an electron donor. This donor will advantageously be used as soon as possible after the first step in the preparation of the solid catalytic complex (a) leading to the production of a liquid catalytic complex. The electron donor may thus be used either at any stage in the preparation of the solid catalytic complex but subsequent to production of the liquid complex, or directly at the polymerization stage.

In a first embodiment of the invention using an electron donor, the donor is used at the stage of the manufacture of the solid catalytic complex (a). In a first variant of this embodiment, the liquid complex obtained from the first step in the preparation of the solid catalytic complex (a) is subjected to a treatment using an electron donor. In a second variant of this embodiment, the solid catalytic complex obtained from the post-treatment using a halogen-containing organoaluminium compound, and preferably after optional maturation and washing steps, is subjected to a treatment using an electron donor (before placing the solid catalytic complex (a) in contact with the olefin).

The treatment using the electron donor in the first embodiment (according to the two variants) may be performed by any suitable known means. The electron donor may be added in the pure state to the liquid complex obtained after the first step, or to the solid catalytic complex obtained after the third or the fourth step, or in the form of a solution in a solvent as defined above.

The temperature at which the treatment using the electron donor is carried out in the first embodiment of the invention is preferably below the decomposition temperatures of the electron donor and the liquid complex. It is generally at least −20° C., more precisely at least 0° C., values of at least 20° C. being the most common. The temperature is usually not more than 150° C., in particular not more than 120° C., temperatures of not more than 100° C. being recommended, for example not more than 70° C.

The duration of the treatment using the electron donor in the first embodiment is commonly from 0.5 minute to 5 hours, preferably from 1 minute to 2 hours, for example from 5 minutes to 1 hour. The pressure at which the treatment is performed is not critical; the process is preferably performed at atmospheric pressure.

The amount of electron donor used in the first embodiment is usually at least 0.01 mol per mole of transition metal used, more precisely at least 0.02 mol, values of at least 0.05 mol being the most advantageous. The amount of electron donor used usually does not exceed 50 mol per mole of transition metal used, and preferably does not exceed 20 mol, values of not more than 5 mol being the most recommended. Amounts from 0.2 to 12 mol are particularly suitable.

The first embodiment using an electron donor at the stage of the manufacture of the solid catalytic complex (a) makes it possible not only to increase the apparent density of the polyolefins obtained but also to reduce the oligomer content of the polyolefins obtained. In particular, the first variant makes it possible to increase the activity of the solid catalytic complex towards polymerization and to obtain a solid catalytic complex which is more sensitive to polyolefin molecular weight regulators. The second variant also makes it possible to modify the response of the solid catalytic complex to polyolefin molecular weight regulators (for example hydrogen) by variation of the amount of electron donor used. It has, indeed, been observed that the more the amount of electron donor used is increased, the more pronounced is the response of the solid catalytic complex to the regulator. It results therefrom that a very wide range of polyolefins having markedly different molecular weights, and thus markedly different melt indices, may be obtained.

In a second embodiment of the invention, an electron donor is used in the polymerization medium. This second embodiment proves to give particularly good performance when the polymerization is carried out in the gas phase. In this embodiment, the electron donor may be introduced separately into the polymerization medium at any moment, preferably at the start of the polymerization. As a preferred variant, the electron donor may be introduced into the polymerization medium mixed with the organometallic compound, the mixture being prepared beforehand. This mixture may be obtained simply by placing the electron donor in contact with the organometallic compound or by adding the electron donor, preferably gradually, to a solution of the organometallic compound (cocatalyst) or alternatively by adding a solution of the electron donor to a solution of the organometallic compound. It is preferred to add the electron donor in the pure state to a solution of the organometallic compound in a solvent as defined above.

The amount of electron donor used in the second embodiment is usually such that the molar ratio of the amount of organometallic compound used to the amount of electron donor used is at least 0.01, more precisely at least 0.05, values of at least 0.2 being the most advantageous. The ratio of these amounts usually does not exceed 100, and preferably does not exceed 80, values of not more than 60 being the most recommended.

The second embodiment using an electron donor at the olefin polymerization stage has the advantage not only of increasing the apparent density of the polyolefins obtained but also of increasing the activity of the solid catalytic complex towards polymerization. It proves to be particularly advantageous in a gas phase polymerization process which is characterized in general by a limited capacity for heat transfer, since the kinetic profile of the solid catalytic complex has a pronounced induction period.

For the purposes of the present invention, the term electron donor is understood to denote organic compounds containing one or more atoms or one or more groups of atoms having one or more pairs of free electrons, such as, for example, oxygen, nitrogen, sulphur or groups comprising one of these elements. Examples of electron donors which may be used in the process according to the invention are alcohols, phenols, ethers, ketones, aldehydes, organic acids, organic acid esters, organic acid halides, organic acid amides, amines, alkoxysilanes and nitriles.

Alcohols and phenols which may be used, for example, are those comprising up to 18 carbon atoms, such as methyl alcohol, n-butyl alcohol, cyclohexyl alcohol, stearyl alcohol and phenol. Examples of ethers which may be used are those comprising from 2 to 20 carbon atoms, such as isoamyl ether. The ketones which may generally be used are those containing from 3 to 18 carbon atoms, such as methyl ethyl ketone and acetophenone. The aldehydes commonly used are those containing from 2 to 15 carbon atoms, such as octylaldehyde and benzaldehyde. Examples of organic acids are those containing up to 24 carbon atoms, such as butyric acid and anisic acid. Organic acid esters which may be used, for example, are those containing from 2 to 30 carbon atoms, such as methyl acetate, ethyl propionate, methyl butyrate, propyl methacrylate, ethyl benzoate, phenyl benzoate, ethyl o-methoxybenzoate, methyl p-toluate, methyl salicylate, ethyl naphthoate, and ethyl or butyl phthalate and anisate. Ethyl benzoate, octadecyl 3,5-bis(1,1-dimethylethyl)-4-hydroxybenzenepropanoate and dibutyl phthalate are particularly suitable. Examples of organic acid halides which may be mentioned are those containing 2 to 15 carbon atoms, such as acetyl chloride and toluoyl chloride. Acid amides which may be mentioned, for example, are acetamide, benzamide and toluamide. The amines which may be used are, for example, diethylamine, piperidine, tribenzylamine, aniline and pyridine. Nitriles which may be used, for example, are acetonitrile and benzonitrile. Alkoxysilanes which may be used are tetraethoxysilane and dimethyldiethoxysilane. The alcohols, ethers, organic acid esters and alkoxysilanes are suitable for use. The organic acid esters are preferred, in particular ethyl benzoate and dibutyl phthalate and even more particularly ethyl benzoate.

The polymerization process according to the invention is performed by placing the olefin in contact with the catalytic system comprising a solid catalytic complex (a) and an organometallic compound (b) which serves as an activator and, where appropriate, an electron donor.

The olefin which is polymerized may be chosen from olefins containing from 2 to 20 carbon atoms and preferably from 2 to 6 carbon atoms, such as ethylene, propylene, 1-butene, 4-methyl-1-pentene and 1-hexene. Ethylene, 1-butene and 1-hexene are suitable for use. Ethylene is particularly preferred. Obviously, several different olefins may be used simultaneously in order to obtain copolymers, for example mixtures of two of the olefins mentioned above or one or more of these olefins with one or more diolefins preferably comprising from 4 to 20 carbon atoms. These diolefins may be non-conjugated aliphatic diolefins such as 1,4-hexadiene, monocyclic diolefins such as 4-vinylcyclohexene, 1,3-divinylcyclohexane, cyclopentadiene or 1,5-cyclooctadiene, alicyclic diolefins having an endocyclic bridge such as dicyclopentadiene or norbornadiene, and conjugated aliphatic diolefins such as butadiene and isoprene.

The process according to the invention applies particularly well to the manufacture of homopolymers of ethylene and copolymers containing at least 90 mol % of ethylene and preferably 95 mol % of ethylene.

The polymerization process of the invention may be carried out according to any known process, in solution in a solvent which may be the olefin itself in the liquid state, or in suspension in a hydrocarbon diluent, or alternatively in the gas phase. Good results are obtained in suspension polymerizations.

The suspension polymerization is generally carried out in a hydrocarbon diluent such as liquid aliphatic, cycloaliphatic and aromatic hydrocarbons, at a temperature such that at least 80% (preferably at least 90%) of the polymer formed is insoluble therein. The preferred diluents are linear alkanes such as n-butane, n-hexane and n-heptane, or branched alkanes such as isobutane, isopentane, isooctane and 2,2-dimethylpropane, or cycloalkanes such as cyclopentane and cyclohexane, or mixtures thereof. The best results are obtained with hexane and isobutane. The polymerization temperature is generally chosen to be between 20 and 200° C., preferably between 50 and 150° C., in particular between 65 and 115° C. The partial pressure of the olefin is usually chosen to be between atmospheric pressure and 5 MPa, preferably between 0.2 and 2 MPa, or particularly between 0.4 and 1.5 MPa.

The gas phase polymerization consists in placing a gas stream comprising at least one olefin in contact with the catalytic system for example in a fluidized bed. The flow rate of the gas stream should consequently be sufficient to maintain the polyolefin in fluidization and depends upon the rate of formation of the latter and on the rate at which the catalytic system is consumed. The total partial pressure of the olefin(s) may be less than or greater than atmospheric pressure, the preferred partial pressure ranging from atmospheric pressure to about 7 MPa. In general, a pressure of 0.2 to 5 MPa is suitable for use. The choice of temperature is not critical; it is generally from 30 to 200° C. A dilution gas, which should be inert towards the polyolefin, may optionally be used.

The polymerization process of the invention may optionally be carried out in the presence of a molecular weight regulator such as hydrogen.

The polymerization process of the invention may be carried out in a continuous or batchwise manner, in a single reactor or in several reactors arranged in series, the polymerization conditions (temperature, possible content of comonomer, possible content of hydrogen, type of polymerization medium) in one reactor being different from those used in the other reactors.

The polymerization process of the invention makes it possible to manufacture polyolefins having a high apparent density.

EXAMPLES

The examples which follow are intended to illustrate the invention. The meaning of the symbols used in these examples, the units expressing the magnitudes mentioned and the methods for measuring these magnitudes are explained below.

$MI_2$=melt index of a polyolefin, denoting the flow rate of the molten polyolefin at 190° C., which flows through a die 2 mm in diameter and 8 mm in length, under the action of a piston ballasted with a weight of 2.16 kg, this flow rate being expressed in g/10 min, according to ASTM standard D 1238 (1990).

AD=apparent density of a polyolefin, expressed in kg/m$^3$ and measured by free flow according to the following procedure: the polymer powder to be analysed is poured into a cylindrical container with a capacity of 50 cm$^3$, taking care not to pack it down, from a hopper whose lower edge is arranged 20 mm above the upper edge of the container. The container filled with powder is then weighed, the tare is deducted from the weight reading and the result obtained (expressed in g) is divided by 50.

SD=standard density of a polyolefin, expressed in kg/m$^3$ and measured according to standard ISO 1183 (1987).

$\mu$=dynamic viscosity of a polyolefin, expressed in dPA.s and measured at a rate gradient of 100 s$^{-1}$ at 190° C.

$\alpha$=activity of the solid catalytic complex, expressed in kg of insoluble polyolefin obtained per hour and per gram of titanium used and per MPa of pressure of olefin.

OC=oligomer content of a polyolefin, expressed in grams of oligomers per kg of polyolefin and measured by extraction into boiling hexane.

In the examples, solid catalytic complexes were prepared and were then used for the polymerization of ethylene.

Example 1 (reference)

In this example, ethylene was copolymerized with butene with the incorporation of a solid catalytic complex prepared without subsequent treatment using a halogen-containing organoaluminium compound.

A. Preparation of the Solid Catalytic Complex
A.1. First Step of Formation of a Liquid Complex Magnesium diethoxide, which was prepared in situ by reacting magnesium metal with ethanol, was reacted for 5 hours at 110° C. with titanium tetrabutoxide in amounts such that the molar ratio of titanium to magnesium was equal to 2.

A.2. Second Step of Precipitation of the Liquid Complex

The liquid complex obtained in A.1. was precipitated by placing it in contact with a solution of isobutylaluminium dichloride in hexane (in an amount such that the molar ratio of aluminium to titanium was equal to 6) with stirring for 2 hours at 45° C.

A.3. Maturation

The mixture obtained in A.2. underwent maturation for 45 minutes at 60° C.

A.4. Third Step Followed by a Washing Operation

The solid catalytic complex obtained in A.3. was collected and then washed in hexane. The solid catalytic complex obtained comprised (% by weight):

Ti: 19.5
Cl: 63.2
Al: 2.8
Mg: 5.4.

The remainder was made up of elements originating from the products used for the manufacture of the solid catalytic complex, such as carbon, hydrogen and oxygen.

B. Copolymerization of Ethylene

Ethylene was continuously copolymerized with butene in a loop reactor into which were continuously introduced hexane, ethylene (in an amount such that the concentration of ethylene in the hexane was equal to 25 g/kg), hydrogen (in an amount such that the hydrogen/ethylene molar ratio was equal to 0.084), butene (in an amount such that the butene/ethylene molar ratio was equal to 0.070), triethylaluminium (in an amount such that the concentration, expressed as aluminium, in the hexane was equal to 27.5 ppm) and the solid catalytic complex obtained in Example 1.A. The temperature in the reactor was 78° C. The continuous process was characterized by a residence time of 2.15 h and a production of 19.6 kg/h. The polyethylene collected had the following characteristics:

MI$_2$=1.9
SD=953.9
OC=4.0
AD=330.

Example 2 (in accordance with the invention)

In this example, a copolymer of ethylene and butene having the MI$_2$ and SD values of the copolymer of Example 1 was prepared (by adapting the concentration of hydrogen and of butene in the process of Example 1.B.), with the incorporation of a solid catalytic complex prepared with the aid of a single subsequent treatment so as to use a total amount (sum of the second step and of the subsequent treatment) of chlorine per alkoxy group (present in the magnesium compound and in the transition metal compound) which is identical to that used in Example 1.

A. Preparation of the Solid Catalytic Complex
A.1. First Step of Formation of a Liquid Complex Magnesium diethoxide, which was prepared in situ by reacting magnesium metal with ethanol, was reacted for hours at 110° C. with titanium tetrabutoxide in amounts such that the molar ratio of titanium to magnesium was equal to 1.

A.2. Second Step of Precipitation of the Liquid Complex

The liquid complex obtained in A.1. was precipitated by placing it in contact with a solution of isobutylaluminium dichloride (IBADIC) in hexane (in an amount such that the molar ratio of aluminium to titanium was equal to 4.5) with stirring for 75 minutes at 45° C.

A.3. Maturation

The mixture obtained in A.2. underwent maturation for 60 minutes at 45° C.

A.4. Third Step Followed by a Washing Operation

The solid catalytic complex obtained in A.3. was collected and then washed in hexane.

A.5. External Treatment

The solid catalytic complex obtained in A.4. was subjected to a post-treatment in hexane. The post-treatment consisted in adding, over 45 minutes at 45° C., an amount of IBADIC such that the Al/Ti ratio=2.5.

A.6. Maturation Followed by a Washing Operation

The solid catalytic complex obtained in A.5. underwent maturation for 45 minutes at 60° C. Finally, the catalytic complex was washed with hexane. The solid catalytic complex obtained comprised (% by weight):

Ti: 11.9
Cl: 65.6
Al: 4.3
Mg: 10.0.

The remainder was made up of elements originating from the products used for the manufacture of the solid catalytic complex, such as carbon, hydrogen and oxygen.

B. Copolymerization of Ethylene

The operations of Example 1.B. were repeated, using the catalyst obtained in A. under the following operating conditions:

hydrogen/ethylene molar ratio=0.081
butene/ethylene molar ratio=0.054.

The polyethylene collected had the following characteristics:

$MI_2$=1.9
SD=953.6
OC=5.0
AD=390.

Comparison of the results of Example 2 with those of Example 1 demonstrates the progress provided by the invention as regards the apparent density of the polyolefins obtained.

Example 3 (in accordance with the invention)

In this example, ethylene was polymerized with the incorporation of a solid catalytic complex containing two different transition metals, which was prepared by means of a single subsequent treatment.
A. Preparation of the Solid Catalytic Complex
A.1. First Step of Formation of a Liquid Complex Magnesium diethoxide was reacted for 7 hours at 140° C. with titanium tetrabutoxide and zirconium tetrabutoxide in amounts such that the molar ratio of titanium to magnesium was equal to 0.5 and such that the molar ratio of zirconium to titanium was equal to 1.2.
A.2. Second Step of Precipitation of the Liquid Complex The liquid complex obtained in A.1. was precipitated by placing it in contact with isobutylaluminium dichloride (in an amount such that the molar ratio of aluminium to the total amount of titanium and zirconium used was equal to 8.2) with stirring for 90 minutes at 45° C.
A.3. Maturation The mixture obtained in A.2. underwent maturation for 60 minutes at 45° C.
A.4. Third Step Followed by a Washing Operation The solid catalytic complex obtained in A.3. was collected and then washed in hexane.
A.5. Subsequent Treatment To a suspension of the solid catalytic complex obtained in A.4. in hexane was added, with stirring, isobutylaluminium dichloride (in an amount such that the molar ratio of aluminium to the total amount of titanium and zirconium used was equal to 1.8) over 30 minutes at 45° C.
A.6. Maturation Followed by a Washing Operation The mixture obtained in A.5. underwent maturation for 90 minutes at 60° C. The solid catalytic complex was then washed in hexane. The solid catalytic complex obtained comprised (% by weight):

Ti: 7.3

Zr: 14.0

Cl: 61.5

Al: 2.6

Mg: 6.6.

The remainder was made up of elements originating from the products used for the manufacture of the solid catalytic complex, such as carbon, hydrogen and oxygen.
B. Polymerization of Ethylene 1 l of hexane and 2 mmol of triisobutylaluminium were introduced into a 3 liter autoclave fitted with a stirrer. The temperature was then raised to 85° C. and kept constant throughout the polymerization. A single dose of hydrogen at a pressure of 0.6 MPa and ethylene were then introduced thereto. 8.0 mg of the solid catalytic complex obtained in A. were then injected therein. The partial pressure of ethylene was kept constant at a value of 0.6 MPa for 2 hours. The autoclave was then degassed and cooled. The catalytic complex had an a activity of 201. 140 g of polyethylene, which had the following characteristics, were collected from the autoclave:

$MI_2$=0.58
SD=959.7
OC=33
$\mu$=16000.

Example 4 (in accordance with the invention)

In this example, ethylene was polymerized with the incorporation of a solid catalytic complex prepared in the presence of an electron donor and using a single subsequent treatment.
A. Preparation of the Solid Catalytic Complex The operations of Example 3.A. were repeated.
B. Treatment Using an Electron Donor To a suspension of the solid catalytic complex obtained in A.1. in hexane was added, with stirring, ethyl benzoate in an amount such that the molar ratio of ethyl benzoate to the total amount of titanium and zirconium used was equal to 5. The mixture thus obtained was maintained at 35° C. and with stirring for 1 hour. The solid complex thus treated was then washed with hexane.
C. Polymerization of Ethylene The operations of Example 3.B. were repeated, injecting 12.7 mg of solid catalytic complex. The catalytic complex had an a activity of 172. 191 g of polyethylene, which had the following characteristics, were collected from the autoclave:

$MI_2$=6.5
SD=964.2
OC=15.0
$\mu$=5500.

What is claimed is:

1. A process for the manufacture of olefin polymers containing at least 90 mole % of ethylene, in which at least one olefin is placed in contact with a catalytic system consisting essentially of:

(a) a treated solid catalytic complex comprising magnesium, at least one transition metal selected from the group consisting of titanium and zirconium in an amount of 0.01 to 20 moles per mole of magnesium, and halogen, and (b) an organometallic compound of metal chosen from lithium, magnesium, zinc, aluminum or tin, (c) optionally, an electron donor, said electron donor being used either at any stage in the preparation of the treated solid catalytic complex (a) but subsequent to the production of the liquid complex, or directly at the polymerisation stage, wherein the said treated solid catalytic complex (a) is prepared without prepolymerization by a process consisting essentially of the following steps:

(1) reacting at a temperature from −20 to 200° C., in a first step during from 10 minutes to 20 hours, at least one magnesium compound chosen from oxygen-containing organic magnesium compounds with at least one compound selected from the group consisting of oxygen-containing or halogen-containing tetravalent titanium and zirconium compounds, until a liquid complex is obtained, (2) treating the said liquid complex at a temperature from −20 to 150° C., in a second step, using from 0.5 to 50 mole per mole of transition metal used of a halogen-containing organoaluminium compound of formula $AlR_nX_{3-n}$ in which R is a hydrocarbon radical comprising up to 20 carbon atoms, X is a halogen and n is less than 3, in order to precipitate the liquid complex as a solid catalytic complex, optionally, said second step being followed by a maturation step, (3) separating, in a third step, the solid catalytic complex precipitated from the reaction medium of the second step and washing the separated solid catalytic complex with an inert diluent to remove excess reagent and any by products, and (4) treating at a temperature from −20 to 150° C., in a fourth step, the separated and washed solid catalytic complex obtained after the third step using from 0.1 to 40 mole per mole of transition metal used of a halogen-containing organoaluminum compound of formula $AlR_nX_{3-n}$, optionally, said fourth step being followed by a maturation step, and/or a washing step, and optionally repeating said fourth step, and (5) recovering the treated solid catalytic complex.

2. The process according to claim 1, wherein the fourth step comprises a single treatment using a halogen-containing organoaluminium compound.

3. The process according to claim 2, wherein the halogen-containing organoaluminium compound used in the fourth step is identical to that used in the second step and in that it is used in an amount of from 0.1 to 40 mol of aluminium per mole of total amount of transition metal used.

4. The process according to claim 1, wherein the second step in the preparation of the solid catalytic complex is immediately followed by a maturation operation.

5. The process according to claim 1, wherein the fourth step in the preparation of the solid catalytic complex is followed by a maturation operation and then a washing operation.

6. The process according to claim 1, wherein the liquid complex obtained after the first step is subjected to a treatment using an electron donor before carrying out the second step.

7. The process according to claim 1, wherein the solid catalytic complex obtained after the fourth step is subjected to a treatment using an electron donor before placing the solid catalytic complex in contact with the olefin.

8. The process according to claim 6, wherein the electron donor is used in an amount of from 0.01 to 50 mol per mole of total amount of transition metal used.

9. The process according to claim 1, wherein an electron donor mixed with the organometallic compound is used in the polymerization medium, the amount of electron donor used being such that the molar ratio of aluminium to electron donor is from 0.01 to 100.

10. The process according to claim 6 wherein the electron donor is ethyl benzoate.

11. The process according to claim 1, wherein the magnesium compound is chosen from magnesium dialkoxides.

12. The process according to claim 1, wherein the transition metal compound is chosen from titanium tetraalcoxides.

13. The process according to claim 1, wherein the halogen-containing organoaluminium compound is chosen from ethylaluminium dichloride and isobutylaluminium dichloride.

14. The process according to claim 13, wherein the halogen-containing organoaluminium compound is isobutylaluminium dichloride.

15. The process according to claim 1, wherein the organometallic compound is chosen from triethylaluminium and triisobutylaluminium.

16. The process according to claim 7, wherein the electron donor is used in an amount of from 0.01 to 50 mol per mole of total amount of transition metal used.

17. The process according to claim 7, wherein the electron donor is ethyl benzoate.

18. The process according to claim 9, wherein the electron donor is ethyl benzoate.

19. The process according to claim 1, wherein said inert diluent for washing the separated solid catalytic complex is selected from the group consisting of alkanes and cycloalkanes containing up to 20 carbon atoms.

20. The process according to claim 1, wherein said inert diluent for washing the separated solid catalytic complex is hexane or isobutane.

21. The process according to claim 1, wherein said olefin polymers have a higher apparent density than an analogous solid catalytic complex which is treated with the same quantity of halogen-containing organoaluminium compound in a single treatment.

22. A process for the manufacture of olefin polymers containing at least 90 mole % of ethylene, in which at least one olefin is placed in contact with a catalytic system consisting essentially of:

(a) a treated solid catalytic complex comprising magnesium, at least one transition metal selected from the group consisting of titanium and zirconium in an amount of 0.01 to 20 moles per mole of magnesium, and halogen, and (b) an organometallic compound, chosen from the totally alkylated compounds, the alkylhydrides and the alkylhalides, in which the alkyl radical comprises up to 20 carbon atoms, of lithium, magnesium, zinc, aluminum or tin, (c) optionally, an electron donor, said electron donor being used either at any stage in the preparation of the treated solid catalytic complex (a) but subsequent to the production of the liquid complex, or directly at the polymerisation stage, wherein the said treated solid catalytic complex (a) is prepared without prepolymerization by a process consisting essentially of the following steps:

(1) reacting at a temperature from −20 to 200° C., in a first step during from 10 minutes to 20 hours, at least one magnesium compound comprising at least one magnesium-oxygen-organic radical comprising up to 20 carbon atoms, with at least one compound selected from the group consisting of oxygen-containing tetravalent titanium or zirconium compounds of formula $MO_x(OR')_{4-2}$ where M represents titanium or zirconium, R' represents an organic radical comprising up to 20 carbon atoms and X is such that $0 \leq X \leq 1.5$, or tetravalent titanium, or zirconium halides, until a liquid complex is obtained, (2) treating the said liquid complex at a temperature from −20 to 150° C., in a second step, using from 0.5 to 50 mole per mole of transition metal used of a halogen-containing organoaluminium compound of formula $AlR_nX_{3-n}$ in which R is a hydrocarbon radical comprising up to 20 carbon atoms, X is a halogen and n is less than 3, in order to precipitate the liquid complex as a solid catalytic complex, optionally, said second step being followed by a maturation step, (3) separating, in a third step, the solid catalytic complex precipitated from the reaction medium of the second step and washing the separated solid catalytic complex with an inert diluent to remove excess reagent and any by products, and (4) treating at a temperature from −20 to 150° C., in a fourth step, the separated and washed solid catalytic complex obtained after the third step using from 0.1 to 40 mole per mole of transition metal used of a halogen-containing organoaluminum compound of formula $AlR_nX_{3-n}$, optionally, said fourth step being followed by a maturation step, and/or a washing step, and optionally repeating said fourth step, and (5) recovering the treated solid catalytic complex.

23. A process for the manufacture of olefin polymers containing at least 90 mole % of ethylene, in which at least one olefin is placed in contact with a catalytic system consisting essentially of:

(a) a treated solid catalytic complex comprising magnesium, at least one transition metal selected from the group consisting of titanium and zirconium in an amount of 0.01 to 20 moles per mole of magnesium, and halogen, and (b) an organometallic compound of a metal chosen from lithium, magnesium, zinc, aluminum or tin, (c) optionally, an electron donor, said electron donor being used either at any stage in the preparation of the treated solid catalytic complex (a) but subsequent to the production of the liquid complex, or directly at the polymerization stage, wherein the said treated solid catalytic complex (a) is prepared without prepolymerization by a process consisting essentially of the following steps:

(1) reacting at a temperature from −20 to 200° C., in a first step during from 10 minutes to 20 hours, at least one magnesium compound chosen from oxygen-containing organic magnesium compounds with at least one compound selected from the group consisting of oxygen-containing or halogen-containing tetravalent titanium and zirconium compounds, until a liquid complex is obtained, (2) treating the said liquid complex at a temperature from −20 to 150° C., in a second step, using from 0.5 to 50 mole per mole of transition metal used, of a halogen-containing organoaluminium compound of formula $AlR_nX_{3-n}$ in which R is a hydrocarbon radical comprising up to 20 carbon atoms, X is a halogen and n is less than 3, in order to precipitate the liquid complex as a solid catalytic complex, (3) separating, in a third step, the solid catalytic complex precipitated from the reaction medium of the second step and washing the separated solid catalytic complex with an inert diluent to remove excess reagent and any by products, and (4) treating at a temperature from −20 to 150° C., in a fourth step, the separated and washed solid catalytic complex obtained after the third step using from 0.1 to 40 mole per mole of transition metal used, of a halogen-containing organoaluminum compound of formula $AlR_nX_{3-n}$, (5) recovering the treated solid catalytic complex.

* * * * *